US012748590B2

(12) United States Patent
Parker et al.

(10) Patent No.: US 12,748,590 B2
(45) **Date of Patent: *Sep. 29, 2026**

(54) TECHNIQUES FOR SERVICE DEVELOPMENT

(71) Applicant: THE HUNTINGTON NATIONAL BANK, Columbus, OH (US)

(72) Inventors: Adam Parker, Columbus, OH (US); Adam Bestic, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/257,002

(22) Filed: Jul. 1, 2025

(65) Prior Publication Data

US 2026/0086799 A1 Mar. 26, 2026

Related U.S. Application Data

(63) Continuation of application No. 18/894,888, filed on Sep. 24, 2024, now Pat. No. 12,373,205.

(51) Int. Cl.
*G06F 8/77* (2018.01)

(52) U.S. Cl.
CPC .................................... *G06F 8/77* (2013.01)

(58) Field of Classification Search
CPC ........................................................ G06F 8/77
See application file for complete search history.

(56) References Cited

U.S. PATENT DOCUMENTS

| | | | | |
|---|---|---|---|---|
| 7,779,089 | B2 * | 8/2010 | Hessmer | H04L 67/565 709/220 |
| 8,639,555 | B1 * | 1/2014 | Johnston | G06Q 10/0631 705/7.27 |
| 9,736,199 | B2 * | 8/2017 | Chang | H04L 65/403 |
| 10,528,327 | B2 * | 1/2020 | Kumar | G06F 8/10 |
| 10,846,204 | B2 * | 11/2020 | Vaishnav | G06F 11/3612 |
| 11,487,596 | B2 * | 11/2022 | Liu | G06F 9/547 |
| 2006/0271537 | A1 * | 11/2006 | Chandrasekharan | G06F 8/36 |
| 2007/0276689 | A1 * | 11/2007 | Slone | G06F 3/04817 717/109 |

(Continued)

*Primary Examiner* — Wei Y Mui
*Assistant Examiner* — Amir Soltanzadeh
(74) *Attorney, Agent, or Firm* — Kilpatrick Townsend & Stockton LLP

(57) ABSTRACT

The disclosed techniques may include receiving a request for a first step of a development workflow for deploying a standardized computer function within an organization. In addition, the techniques may include identifying a first file corresponding to the first step of the workflow. The techniques may include providing the first file to the application of the client device to cause the application of the client device to display a first text element at a first portion of a graphical interface and a first interactive element at a second portion of the graphical interface. The techniques may include receiving first information from the first interactive element. The techniques may include generating a deployment file for implementing a first step of the development workflow based at least in part on the received first information. The deployment file may specify settings for causing servers to deploy an application programming interface.

18 Claims, 8 Drawing Sheets

(56) References Cited

U.S. PATENT DOCUMENTS

| | | | | |
|---|---|---|---|---|
| 2011/0131511 | A1* | 6/2011 | Luo | G06F 8/34<br>715/762 |
| 2016/0201446 | A1* | 7/2016 | Anghelescu | E21B 41/00<br>702/9 |
| 2017/0346683 | A1* | 11/2017 | Li | H04L 41/5058 |
| 2020/0004798 | A1* | 1/2020 | Weinert, Jr. | G06F 16/958 |
| 2021/0124610 | A1* | 4/2021 | Gardner | G06F 9/4881 |
| 2022/0066847 | A1* | 3/2022 | Liu | G06F 9/541 |
| 2022/0413844 | A1* | 12/2022 | Gross | G06F 8/71 |
| 2024/0289718 | A1* | 8/2024 | Eayrs | G06Q 10/0633 |

* cited by examiner

500

TECHNIQUES FOR SERVICE DEVELOPMENT

CROSS-REFERENCE TO RELATED APPLICATION

This is a continuation of U.S. patent application Ser. No. 18/894,888, filed Sep. 24, 2024, and titled "TECHNIQUES FOR SERVICE DEVELOPMENT," the entirety of which is incorporated herein by reference.

BACKGROUND

An organization may use a variety of services to perform the organization's standard computer functions. These services may not be integrated, and software developers may need to provide instructions to multiple services in order to perform these standard computer functions. Each service can use separate technical documentation and the software developer may need to cross reference the documentation in order to determine how to perform a particular function. In addition, each service may use a separate endpoint and the software developer may need to interface with multiple endpoints to perform the standard computer function. Accordingly, improvements to software development within an organization are desirable.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, techniques may include receiving, from an application of a client device, a request for a first step of a development workflow for deploying a standardized computer function within an organization, where the request identifies the development workflow and includes an account identifier. The techniques may also include identifying a first file corresponding to the first step of the development workflow in a repository, where the first file may include code corresponding to a first text element and a first interactive element. The techniques may furthermore include providing the first file to the application of the client device, where the first file is configured to cause the application of the client device to display the first text element at a first portion of a graphical interface and the first interactive element at a second portion of the graphical interface, where the first text element is descriptive of the first interactive element. The techniques may in addition include receiving first information corresponding to the first step of the development workflow from the first interactive element displayed by the graphical interface of the application, where the received first information is identified by the first text element. The techniques may moreover include performing a first action in accordance with the first step of the development workflow, where the first action is performed based at least in part on the received first information. The techniques may also include generating a second file based at least in part on the received first information, the second file usable to implement a second step of the development workflow. The techniques may furthermore include associating the second file and the account identifier. The techniques may in addition include storing the second file to the repository. Other embodiments of this aspect include corresponding methods, computer systems, apparatus, and computer programs recorded on one or more non-transitory computer storage devices, each configured to perform the actions of the techniques.

Implementations may include one or more of the following features. Techniques where the received first information may include at least configuration settings for one or more servers of the organization. Techniques where performing the first action may include: generating a deployment file for implementing the first step of the development workflow, where the deployment file is generated based at least in part on the received first information and the deployment file specifies one or more settings for deploying the standardized computer function of the organization. The techniques may include: providing the deployment file to one or more servers at a conclusion of the development workflow, where the deployment file may include instructions to configure the settings of the one or more servers. Techniques where the instructions cause the one or more servers to implement an application programming interface (API) that permits the client device to access record data of the organization. The techniques may include: receiving a request for a second step of the development workflow from the application of the client device, where the request includes the account identifier; identifying the second file corresponding to the second step of the development workflow in the repository, where the second file may include code corresponding to a second text element and a second interactive element; providing the second file to the application of the client device, where the second file is configured to cause the application to display the second text element at a third portion of a graphical interface and the second interactive element at a fourth portion of the graphical interface; receiving second information corresponding to the second step of the development workflow from the second interactive element displayed by the graphical interface of the application, where the received second information is identified by the second text element; performing a second action in accordance with the second step of the development workflow, where the second action is performed based at least in part on the received second information; generating a third file based at least in part on the received second information, the third file usable to implement a third step of the development workflow; associating the third file and the account identifier; and storing the third file to the repository. Techniques where the first text element and the first interactive element are displayed simultaneously. Implementations of the described techniques may include hardware, a system, a computing device, a method or process, or a non-transitory computer tangible medium.

BRIEF DESCRIPTION OF THE DRAWINGS

Various embodiments in accordance with the present disclosure will be described with reference to the drawings, in which.

DETAILED DESCRIPTION

Figure 1:
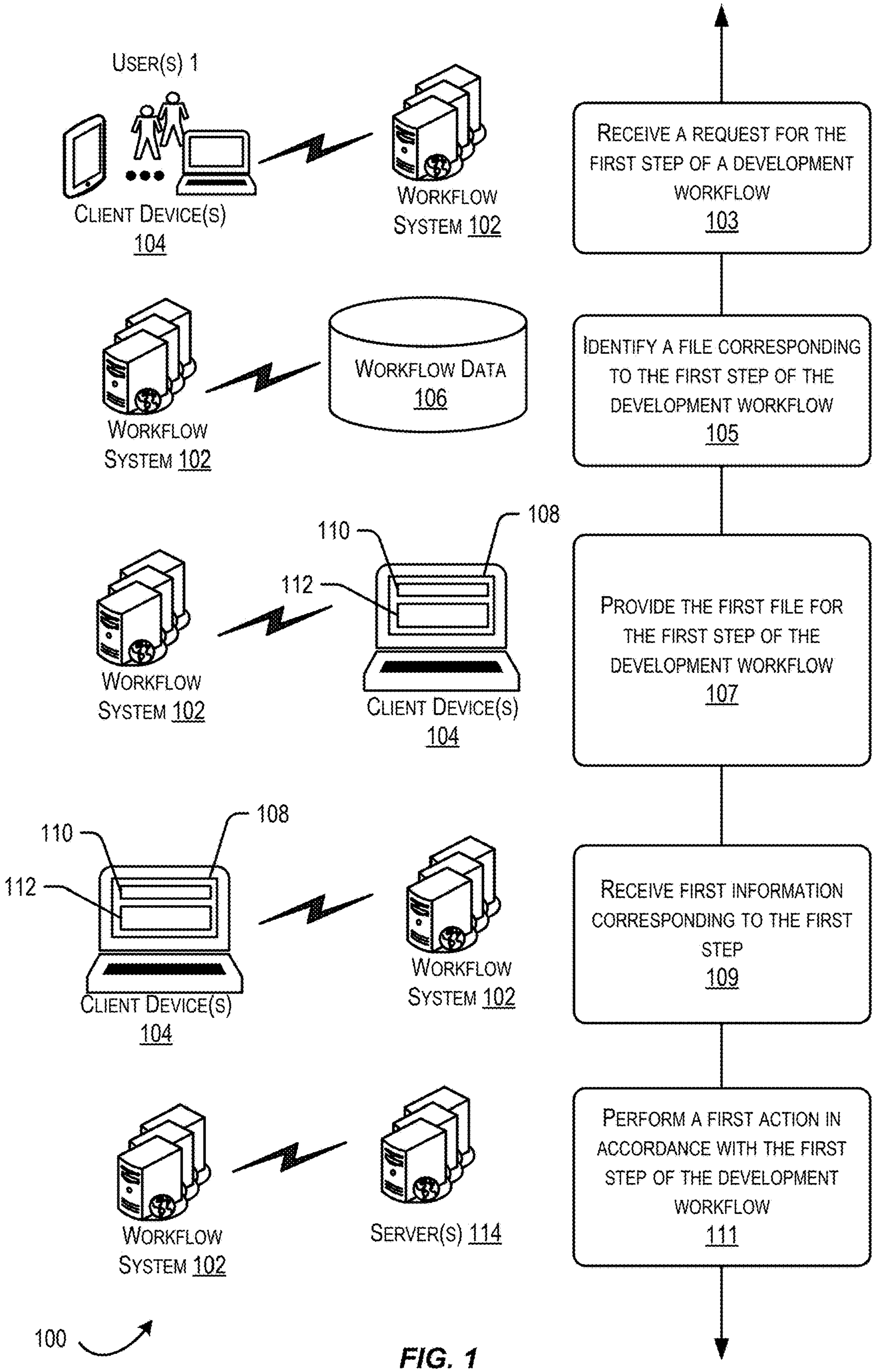
FIG. 1 shows an example flow for an interactive development workflow in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to user interfaces for an interactive development workflow. Software development can be mentally tasking for a developer because performing a standard computer function within an organization can require cross referencing information across a variety of sources. Navigating these sources may require interacting with multiple user interfaces. For example, a first user interface can display information about how to instruct a service to perform an operation and a second user interface can be used provide the instructions to the service.

A development workflow can allow a developer to perform a standardized computer function through a single user interface. The development workflow can be an ordered series of steps for performing a standardized computer function. The workflow can include a single user interface that presents technical documentation for each of the steps. Performing a standardized computer function may be implemented through instructions to external services, and each of these services can have separate technical documentation. The development workflow user interface can present relevant portions of the documentation from each of these services alongside interactive elements. The interactive elements can be fields where the developer can provide information to the external services (e.g., rather than through separate interfaces for each service). The user interface can present the user with the relevant information (e.g., technical documentation) that is needed to complete a step in the workflow. This information can be presented in the user interface alongside interactive fields that the developer can use to take actions to complete the step.

For example, a standardized computer function can include deploying or configuring an application programming interface, changing the shape of a host device, migrating a tenant from a first host device to a second host device, adding a locally managed host device to a cloud computing network, etc. The development workflow can be implemented using a graphical user interface that can allow the developer to review a service's technical documentation, and to provide input to the service, through a single interface. The user interface can be divided into a first portion that displays text-based information (e.g., technical documentation) and a second portion that can receive user input.

A developer can perform a standardized computer function by proceeding through the development workflow. The development workflow can be implemented by a workflow system, and this system can present a user interface for each step in the workflow. Each user interface in the development workflow can provide information that describes the desired input for the step and an interactive graphical element for receiving the input from the developer (e.g., user). The workflow system can perform an action in accordance with the step in the development workflow after receiving the input via the user interface. The actions in accordance with the step can include provisioning a computing device, configuring a computing device, generating a file, updating a file, providing credentials to a computing system, and the like.

The user interfaces for a development workflow (e.g., the development workflow) can improve the functioning of a computer system by reducing the number of user interfaces that a developer interacts with to perform a standardized computer function. Using fewer user interfaces can reduce the computing resources that are required to perform the standardized computing function. Each user interface may be separately hosted and provided to the developer's client device, and performing the same functionality with fewer interfaces can reduce the network bandwidth, storage utilization and processing power consumed by the computing system implementing the standardized computer function.

The disclosed user interfaces can improve the functioning of a computer system by making the user interfaces more accessible to individuals with physical limitations. Displaying text elements (e.g., the technical documentation) and the interactive elements on a single user interface can allow an individual with a physical limitation to more efficiently use the workflow system because fewer inputs are required to navigate the interfaces. For example, the interface is more accessible to someone with physical limitations because the individual does not need to navigate between separate interfaces.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Moving on to FIG. 1 which illustrates an example flow 100 for an interactive development workflow in accordance with at least one embodiment. The operations discussed in connection with FIG. 1 may be performed with a Workflow System 102. In some embodiments, Workflow System 102 may be implemented by one or more computer(s), as a service, within an application, or the like. The operations discussed in connection with FIG. 1 may be performed in any suitable order. More or fewer operations than those depicted in FIG. 1 may be employed without diverting from this disclosure.

The flow 100 may begin at 103, where a request for a first step of a development workflow is received. The request can be received from a client device 104 and at the Workflow System 102. The request can be received at an ingestion engine of the Workflow System 102.

For example, the interface module of the Workflow System 102 may provide instructions that cause the client device 104 to perform operations to present a graphical interface on the device's display (e.g., graphical interface 108). The request can be received at the Workflow System 102 from the client device 104 via the graphical interface.

At 105, a file corresponding to the first step of the development workflow can be identified. The file can be identified in workflow data 106 in response to the request at 103, and the data can be identified from a repository. The file can be a document such as a Hypertext Markup Language (HTML) document or an Extensible Markup Language (XML) document. Identifying the file can include identifying one or more libraries that provide functionality to implement the first step of the development workflow.

At 107, the first file for the first step of the development workflow can be provided by the Workflow System 102 to the client device(s) 104. In some embodiments, the one or more libraries identified at 105 can be provided to the client device(s) 104. The libraries can provide instructions that cause the client device(s) 104 to perform operations to provide routing functionalities in some embodiments. The first file for the first step of the development workflow can provide instructions that cause the client device(s) 104 to perform operations to display a graphical interface 108. The graphical interface can be displayed by an application such as a web browser application.

A development workflow can be an ordered sequence of application programming interfaces that can be used to deploy a standard computer function of an organization. A standard computer function for an organization (e.g., deploying an API) may require coordinating with one or more external services. For each step in the development workflow, the graphical interface 108 can present an explanation of a current step of the development workflow in a first portion 110 of the graphical interface 108. A second portion 112 of the graphical interface 108 can present one or more interactive fields for receiving information that corresponds to the current step of the development workflow.

For example, the first portion 110 of the graphical interface 108 can provide technical documentation that explains the purpose of the current step. In addition or alternatively, the first portion 110 can present information that specifies the information that is to be input to the interactive fields of the second portion 112. For example, the first portion 110 can may explain that the current step requires a name for an API and the first portion can provide the organization's API naming conventions. The second portion 112 can present an interactive field for receiving the API name.

At 109, first information corresponding to the first step from 103 can be received at the Workflow System 102 from the client device(s) 104. The first information can be received as input to the second portion 112 of the graphical interface 108. The second portion 112 may have one or more interactive elements that can be used to receive the first information. For example, the interactive elements can be any combination of a text field, a file input field, a dropdown menu, a multiple choice menu, and a file browser field.

At 111, a first action in accordance with the first step of the development workflow from 103. The first action can be based on the information that was received at 109. The first action can include identifying an external system that corresponds to the first step and forwarding the information from 109 to the server(s) 114 of the identified external system.

Figure 2:
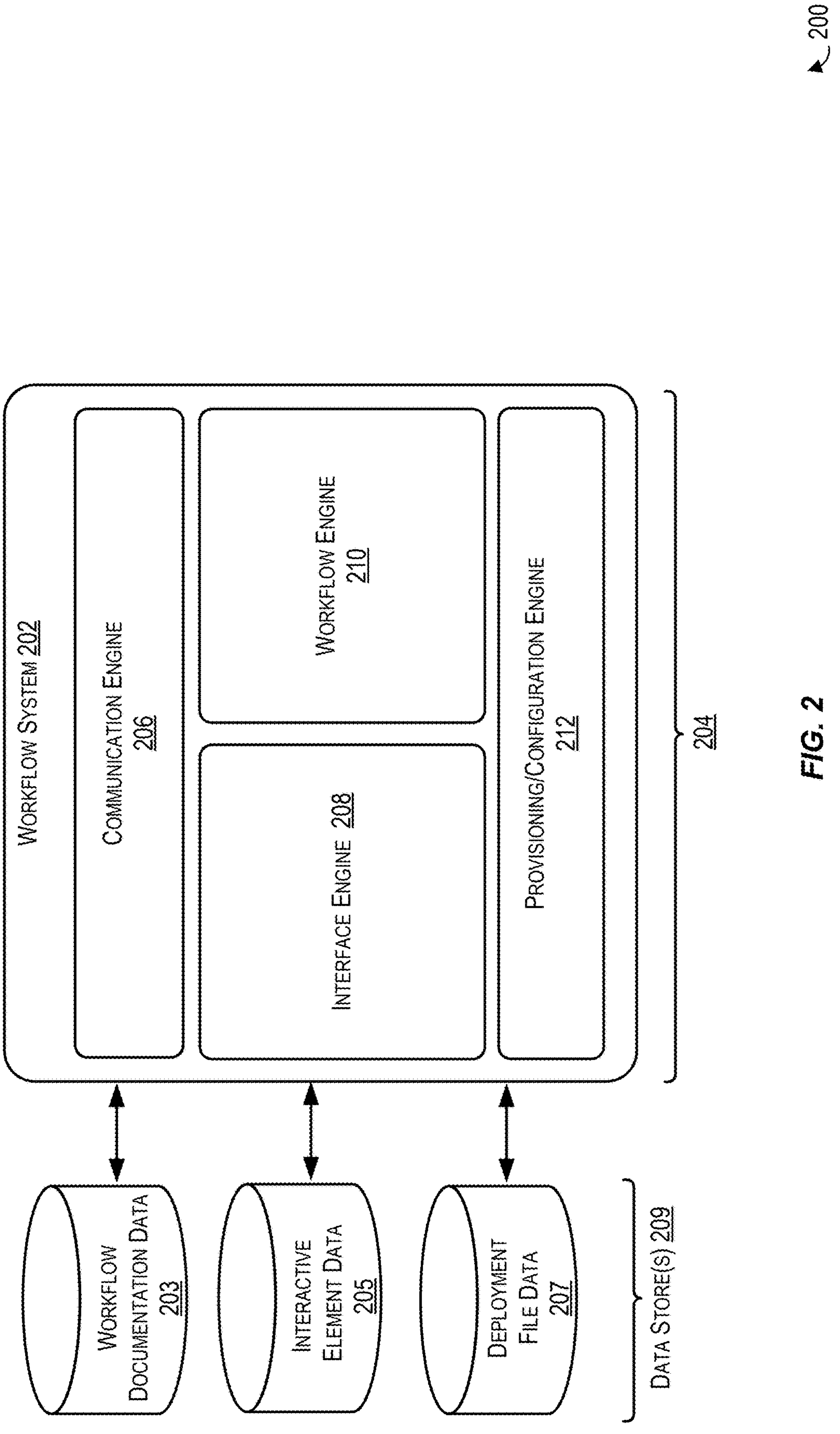
FIG. 2 shows a simplified architecture for an interactive development workflow in accordance with at least one embodiment.

FIG. 2 shows a simplified architecture 200 for an interactive development workflow in accordance with at least one embodiment. Workflow System 202 can be the same as the Workflow System 102 that is described with reference to FIG. 1.

Workflow System 202 can be used to implement an interactive workflow as described herein. Workflow system 202 includes a plurality of engines that may perform functions in accordance with at least one embodiment. The engines may be software engines, hardware engines, or a combination thereof. If the engines are software engines, the engines can be embodied on a computer readable medium and processed by a processor in any of the computer systems described herein. It should be noted that any engine or data store described herein, may be, in some embodiments, be a service responsible for providing functionality corresponding to the engine described below. The engines 204 may be execute as part of the Workflow System 202, or the engines 204 may exist as separate engines or services external to the Workflow System 202. Workflow System 202 is an example of the Workflow System 102. In some embodiments, the engines 204 may be executed by the same or different computing devices, as a service, as an application, or the like.

In the embodiment shown in the FIG. 2, data store(s) 209 such as workflow documentation data 203, interactive element data 205, and deployment file data 207 are shown, although data can be maintained, derived, or otherwise accessed from various data stores, either remote or local to the Workflow System 202, to achieve the functions described herein. The Workflow System 202, as shown in FIG. 2 includes various engines such as a communication engine 206, an interface engine 208, a workflow engine 210, and a provisioning/configuration engine 212. Some functions of the engines 206-210 are described below. However, for the benefit of the reader, a brief, non-limiting description of each of the engines is provided in the following paragraphs. In accordance with at least one embodiment, a process generating and reporting event data is provided.

The communication engine 206 of the Workflow System 202 can implement communication functionality and manage the transfer of information from the workflow system 202 to external systems and devices. For example, the communication engine 206 can authenticate a client device and manage the transfer of information between the Workflow System 202 and the client device over a network. Authentication can include public key encryption such as Diffie-Hellman key exchange.

The interface engine 208 can ingest received data by cleaning, processing, or otherwise transforming the data, and the communication engine 206 can store the ingested data as deployment file data 207. The communication engine 206 can make any received data available to any of the other engines of Workflow System 202 with or without storing the received data to data store(s) 209 (e.g., through processing of the data in memory). The communication engine 206 may transform the received data before storing or making the data available to the other engines of Workflow System 202. Transforming the data can include removing duplicate data, changing data from one format to another (e.g., changing a date from mm/dd/yyyy to yyyy-mm-dd), completing incomplete data entries, correcting corrupted data entries, removing unnecessary data from an event instance, anonymizing data, or otherwise making the received data suitable for use by the other engines 204.

In at least one embodiment, the Workflow System 202 includes the interface engine 208. Generally, the interface engine 208 may be utilized to generate graphical user interfaces, provide the graphical user interfaces to client devices (e.g., to client software or in a web browser application), provide output to the graphical user interfaces, and receive input from the graphical user interfaces. The interface engine 208 can be used to provide notifications to one or more client devices and to generally perform one or more operations with respect to the received data in Workflow System 202.

The interface engine 208 can generate a user interface for displaying a step of a development workflow in the order determined by the workflow engine 210. The interface engine 208 can calculate a position for a graphical element representing each step, and the engine can provide information that causes a client device to display the graphical elements in the order. The workflow engine 210 can retrieve information about the current step for the workflow from workflow documentation data 203. The workflow engine 210 can calculate a position for a first portion of the graphical user interface and the workflow engine 210 can generate instructions that cause a client device to display the workflow documentation data 203 in the first portion.

The interface engine 208 can calculate coordinates for a second portion of the graphical user interface for displaying interactive element data 205. The interface engine 208 can retrieve information that corresponds to a particular interactive element from the interactive element data 205. The information can be retrieved based on any combination of the current step in the development workflow and information received at any preceding step of the development workflow. Coordinates within the second portion of the graphical user interface can be determined by the interface engine 208 for each retrieved interactive element. The interactive elements can be react components in some embodiments.

In some embodiments, the workflow engine 210 can determine the coordinates for the first portion of the graphical user interface and the second portion of the graphical user interface by generating a document that contains the information from the workflow documentation data 203 and the interactive element data 205. The document can be organized according to a document object model and the workflow engine 210 may generate the document according to this tree-based data structure. The document object model can be an object oriented representation of the document and the document object model can be generated by the client computing device. In some embodiments, the workflow engine 210 can generate the document object model and provide the model to the client device that is to render the user interface.

The document can include a root element, a header element, a first portion element, and a second portion element. The root element can be a root node for the document, and the header element, the first portion element, and the second portion element can be the children of the root element in the hierarchical data structure of the data object model. A document object model can be generated for these elements. The header element can include the title and information that identifies the step in the development workflow. The first portion element can be a root node for one or more element nodes that include text elements that display the information from the workflow documentation data. The text elements can be the children of the first portion element in the hierarchical document object model. The second portion element can be the root node for any combination of any number of text elements and interactive elements. For example, one or more interactive elements can be associated with a text element that corresponds to a label for the interactive element.

The document object model can allow for updates to the user interface without retendering unchanged portions of the user interface. If there is a change to the document object model, the changed and unchanged document object models can be compared to determine the changed elements of the document that need to be updated. For example, an interactive element can include one or more check boxes that are positioned next to a list of words. A check box can be selected through input to the user interface and the document object model can be updated to change the graphic representing the check box from an empty box to an "X". Instead of rendering the entire user interface, the updated document object model can be compared to the updated document object model and the element representing the check box can be rerendered without updating the remainder of the user interface.

The step in the development workflow can be determined by the workflow engine 210. The interface engine 208 can be instructed to identify information from the data store(s) 209 by the workflow engine 210. The development workflow can be an ordered sequence of steps for performing a standardized computer function of an organization. In some embodiments, the development workflow can include multiple branches, and a subsequent step in a development workflow can be selected by the workflow engine 210 based on information that was provided by the client device in a preceding step. Information can be received from the client device at the workflow system 202 via the communication engine 206. For example, user input to a graphical user interface that is executing on a client device can be provided to the workflow engine 210 via the communication engine 206.

The standardized computer function for a development workflow may include provisioning or configuring one or more computing devices of a cloud computing system. For example, the standardized computer functions can include, changing the shape of a host device, migrating a tenant from a first host device to a second host device, adding a locally managed host device to a cloud computing network, and deploying an application programming interface (API). Performing the standardized computer functions can include exchanging information with one or more computing systems of the cloud computing system. The computing systems may have application programming interfaces for receiving information and the provisioning/configuration engine 212 may transform information from any format into an appropriate format for a particular application programming interface before providing the information to the corresponding system. For example, an application programming interface may only ingest calendar dates in the format: YYYY/MM/DD, but the information may be received in a DD/MM/YY format. In this example, the provisioning/configuration engine 212 may transform the received date into the ingested format.

The provisioning/configuration engine 212 may configure computing resources for a cloud computing system. For example, the development workflow may be a series of ordered steps for deploying a Kubernetes cluster. A Kubernetes cluster is a group of one or more computing devices that are treated as a single unit and workloads that are sent to the cluster are allocated within the cluster. In this architecture, workloads can be assigned to the cluster without requiring a user to manage the allocation of workloads to individual computing devices. The number of computing devices within a cluster, and the computing resources for each device in the cluster, are specified in a deployment file. The deployment file can represent the state of a cluster and this file can be provided to a cloud computing system application programming interface. The cloud computing system can use this state to deploy a cluster, and if the state changes, the cloud computing system can allocate resources to the cluster until the state specified in the deployment file and the state of the cluster match.

The provisioning/configuration engine 212 can generate deployment or configuration files using information that is received from the client device. For example, the information can be received via the interactive elements of the graphical user interface. The configuration or deployment files can be provided to a computing system of a cloud computing provider via the communication engine 206.

Figure 3:
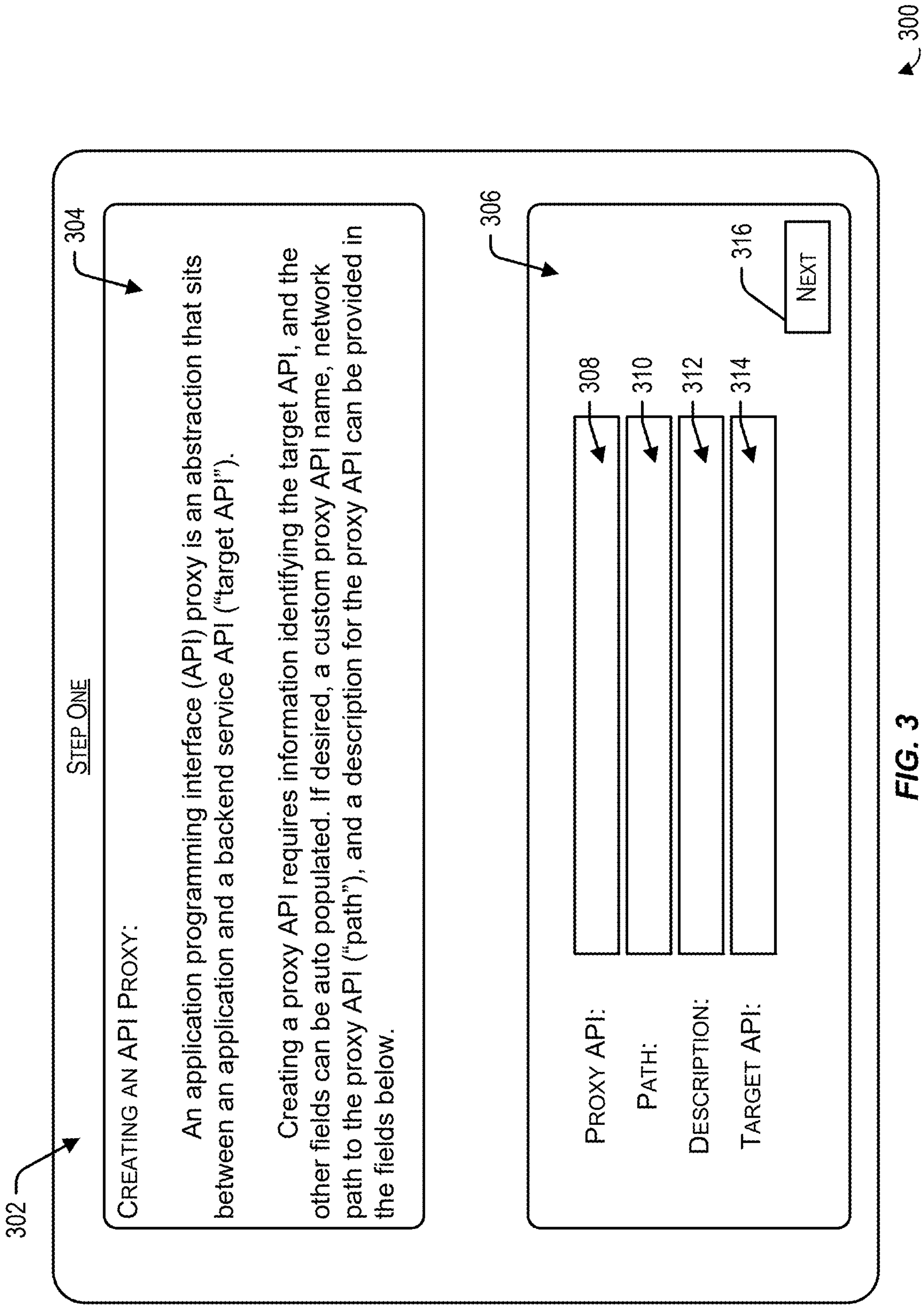
FIG. 3 shows a simplified diagram of a graphical user interface in accordance with at least one embodiment.

FIG. 3 shows a simplified diagram 300 of a graphical user interface 302 according to at least one embodiment. The graphical user interface 302 can be displayed by a client device in response to instructions that are provided by a workflow system to a client device. The instructions can be executed by the client device, and the graphical user interface 302 may be displayed by a web browser application or by client software. The graphical user interface 302 can include a first portion 304 and a second portion 306. In some embodiments, the user interface can include more than two portions.

The first portion 304 can display text-based information about a step of a development workflow. The information that is displayed in the first portion 304 can be obtained from the workflow documentation data (e.g., workflow documentation data 203). The first portion 304 can display information that gives context to the current step of the development workflow. For example, the information can explain the purpose of the current step and the type of information that is to be received via the interactive graphical elements of the second portion 306.

The second portion 306 can display interactive graphical elements. For example, graphical user interface 302 includes interactive graphical elements 308-314. An interactive graphical element can be a portion of the graphical user interface 302 that can receive user input. The client device that is displaying graphical user interface 302 can provide the input to the workflow system. In some embodiments, the input information may be processed or transformed before the information is provided to the workflow system.

Diagram 300 shows a user interface that is part of a deployment workflow, and the step shown in the diagram is about generating an application programming interface (API) proxy. An application programming interface (API) proxy is an abstraction that sits between an application and a backend service API ("target API"). Creating a proxy API requires information identifying the target API, and this information can be provided via interactive graphical element 314. Interactive graphical elements 308-310 can be automatically generated if no input is provided to interactive graphical elements 308-312. For example, the information can be automatically generated if the target API is identified through input to interactive graphical element 314 and input is provided to interactive graphical element 316. Input to interactive graphical element 316 can cause the deployment workflow to proceed to the next step. The selection of the next step may be based in part on the information that is provided to interactive graphical elements 308-314.

Figure 4:
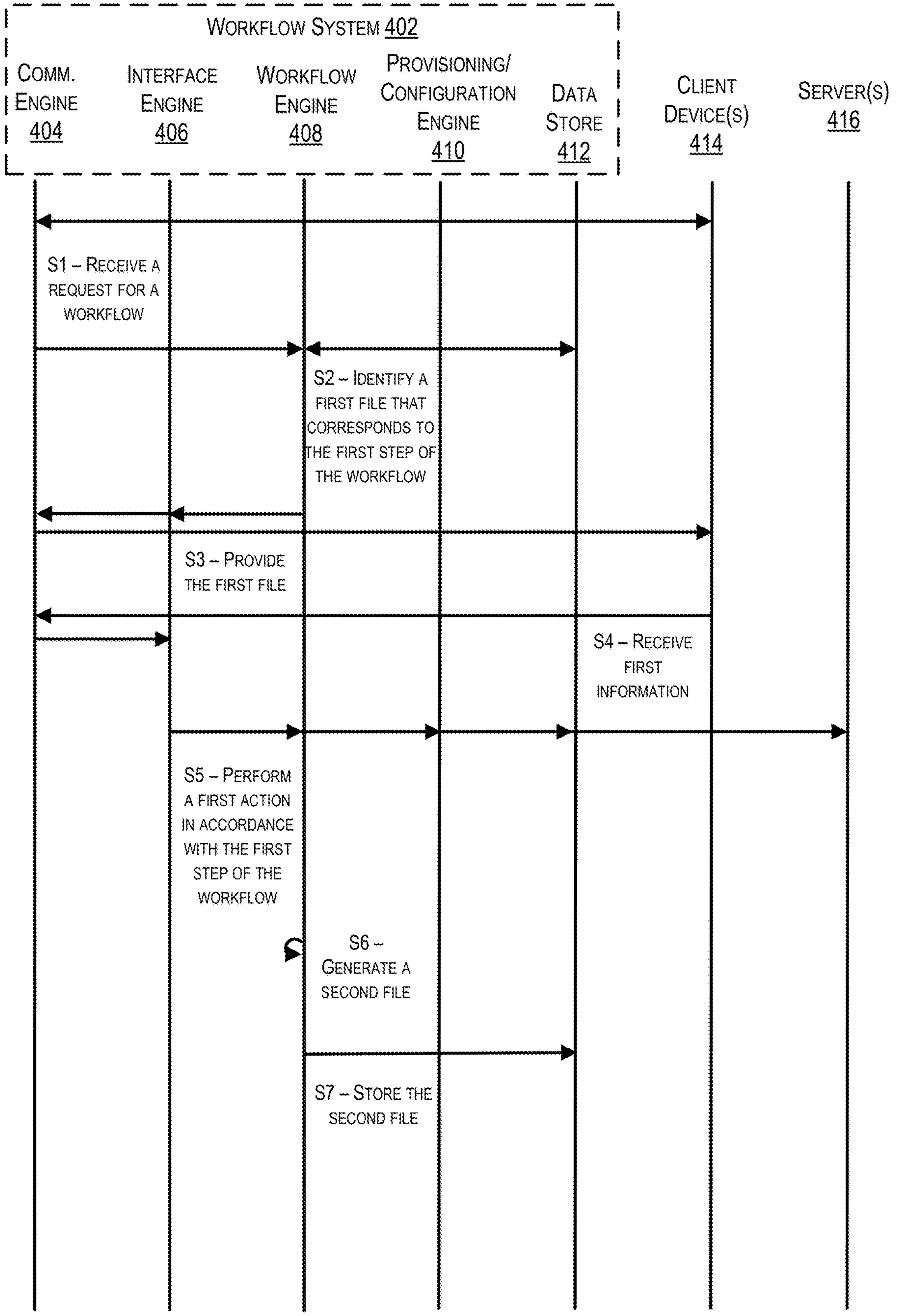
FIG. 4 is a sequence diagram showing a technique for implementing a development workflow in accordance with at least one embodiment.

FIG. 4 is a sequence diagram 400 showing a technique for implementing a development workflow according to at least one embodiment. At S1, the workflow system 402 can receive a request for a workflow at the communication engine 404 from a client device 414.

At S2, the workflow system 402 can identify a file that corresponds to a first step of the workflow that is requested at S1. The communication engine 404 can provide the request from S1, or information about the request, to the workflow engine 408. The workflow engine 408 can identify the file and the file can be retrieved from the data store 412. In some embodiments, the file can be stored in the data store 412 and the file can be provided to the workflow engine 408. In some embodiments, the workflow engine 408 can retrieve information from the data store 412 using the request from S1 and the workflow engine 408 can generate the file using the retrieved information. The file can be a document such as a Hypertext Markup Language (HTML) document or an Extensible Markup Language (XML) document.

At S3, the workflow system 402 can provide the first file from S2 to the client device 414. The client device 414 can be the same client device from S1 or the client device can be a different client device. The file can be a document and the file may be provided to the client device 414 by the workflow engine 408 (e.g., via the interface engine 406 and the communication engine 404). The file may include instructions that cause the client device 414 to display a graphical user interface.

At S4, first information from the client device 414 can be received at the workflow system 402. The first information can be received at the interface engine 406 via the communication engine 404. The client device may receive the first information via the graphical user interface that is displayed at S3. For example, the first information may be received via one or more interactive graphical elements that are shown in a second portion of the graphical user interface from S3.

At S5, the workflow system 402 can perform an action in accordance with the first step of the workflow from S2. The workflow system 402 can determine the action based on the information from S4. The action can be to generate a deployment file using the first information to provide the deployment file to one or more server(s) 416. For example, the workflow engine 408 can receive the first information from the interface engine 406 and the workflow engine 408 can provide the deployment file to the provisioning/configuration engine 410. The deployment file can be a file that causes the server(s) 416 to perform one or more actions. For example, the deployment file can cause server(s) 416 to change one or more configuration parameters, to deploy one or more virtual machines or bare machines on server(s) 416, to provision a computing device so that the device can be added to server(s) 416 (e.g., an on-premises computing device that is managed by a client), etc. The action in accordance with the first step can include generating a deployment file (e.g., by the provisioning/configuration engine 410), and storing the deployment file to the data store 412.

At S6, the workflow engine 408 can generate a second file. The second file can be the same type of file as the first file from S2, or the second file can be a different type of file than the first file from S2. The second file can be generated by the workflow engine 408. In some embodiments, the second file can be retrieved from the data store 412.

At S7, the second file from S6 can be stored by the workflow system 402. The workflow engine 408 can store the second file to the data store 412.

Figure 5:
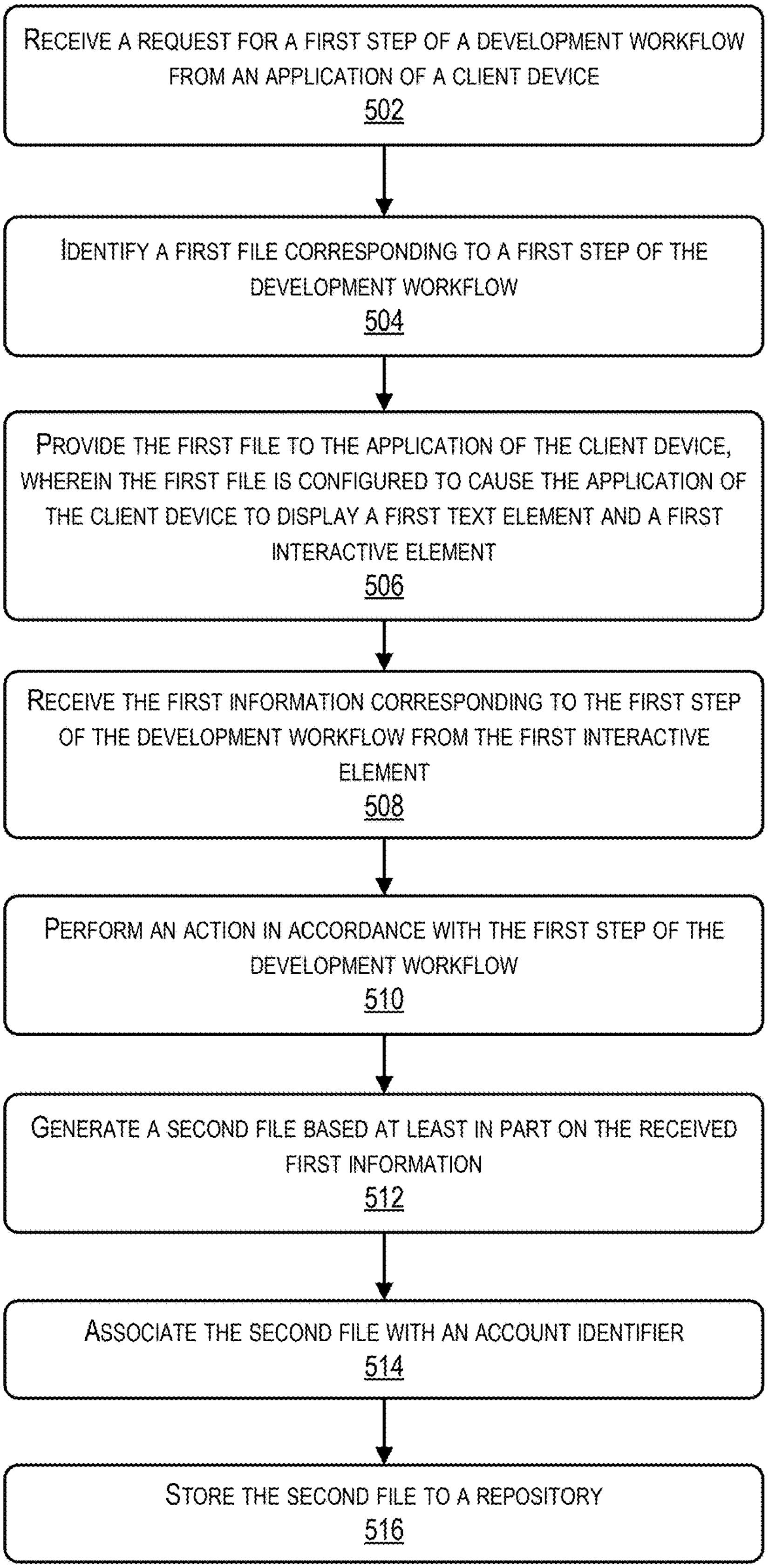
FIG. 5 is a block diagram illustrating an example method for implementing a development workflow, in accordance with at least one embodiment.

FIG. 5 is a block diagram illustrating an example method 500 for implementing a development workflow, in accordance with at least one embodiment. A non-transitory computer-readable storage medium may store computer-executable instructions that, when executed by at least one processor, cause at least one computer to perform instructions comprising the operations of the method 500. It should be appreciated that the operations of the method 500 may be performed in any suitable order, not necessarily the order depicted in FIG. 5. Further, the method 500 may include additional, or fewer operations than those depicted in FIG. 5. The operations of method 500 may be performed by any suitable portion the Workflow System 102 of FIG. 1. In some embodiments, method 500 may be executed by components of Workflow System 202 of FIG. 2. In some embodiments, method 500 may be executed by components of Computing Device 800 of FIG. 8.

The method 500, may begin at 502, a request for a first step of a development workflow can be received from an application of a client device. The development workflow can be one or more operations for deploying a standardized computer function within an organization. A standardized computer function can include deploying or configuring an application programming interface, changing the shape of a host device, migrating a tenant from a first host device to a second host device, adding a locally managed host device to a cloud computing network, etc. The request can identify the development workflow (e.g., from a plurality of development workflows), and the request can include an account identifier. The account identifier can be associated with a user account that generated the request.

At 504, a first file that corresponds to the first step of the development workflow can be identified. The first file can be identified using the information from the request. For example, a user identifier or information that identifies the development workflow (e.g., the information in the request from 502) can be used to identify the first file from a repository. The repository can be stored in one or more of the datastores of the workflow system. The first file can comprise instructions that, when provided to a client device, cause the client device to display a graphical user interface. The first file may be identified within a time period (e.g., 1 second, 5 seconds, 10 seconds, 30 seconds, 1 minute, 5 minutes, or 10 minutes).

At 506, the first file can be provided to the application of the client device from 502. The first file can be configured to cause the application of the client device to display a first text element and a first interactive element (e.g., an interactive graphical element). The first text element can be displayed on a first portion of the graphical user interface and the first interactive element can be displayed in a second portion of the graphical user interface. Any number of text elements can be displayed in the first portion of the graphical user interface and any number of interactive elements can be displayed in the second portion of the graphical user interface. The first portion of the graphical user interface and the second portion of the graphical user interface can be displayed simultaneously so that a user can read the instructions displayed by the text elements and perform the function implemented by the interactive elements more easily.

At 508, the first information that corresponds to the first step of the deployment workflow can be received from the client device. The first information can be received via the first interactive element from 506. The first information can include configuration settings for one or more servers of the organization. In some embodiments, the first information can include a deployment file or information that can be used by the workflow system to generate a deployment file.

At 510, an action in accordance with the first step of the development workflow from 502 can be performed. The action can be performed based at least in part on the first information from 508. The first action can include generating a deployment file for implementing the first step of the development workflow. The deployment file can be generated using the first information from 508, and the deployment file can be received at 508 in some embodiments. The deployment file can specify one or more settings for deploying the standardized computer function of the organization. The deployment file can be provided to one or more servers at a conclusion of the development workflow, or at the conclusion of a step of the development workflow. In some embodiments, the deployment file comprises instructions to configure the settings of the one or more servers. For example, the instructions in the deployment file may cause the one or more servers to implement an application programming interface (API) that permits the client device to access record data of the organization in some embodiments.

At 512, a second file can be generated based at least in part on the received first information from 508. The second file may be usable to implement a second step of the development workflow. The first information may be provided as input to a machine learning model and the model may use the information to identify a next step in the development workflow.

At 514, the second file from 512 can be associated with an account identifier.

At 516, the second file can be stored to the repository. The repository can be stored in the datastores of the workflow system and the repository may be the repository from 504 or a separate repository.

The techniques described in 502-516 may be performed any number of times for any number of steps in a development workflow. For example, the techniques can be performed for a second step of the development workflow.

Figure 6:
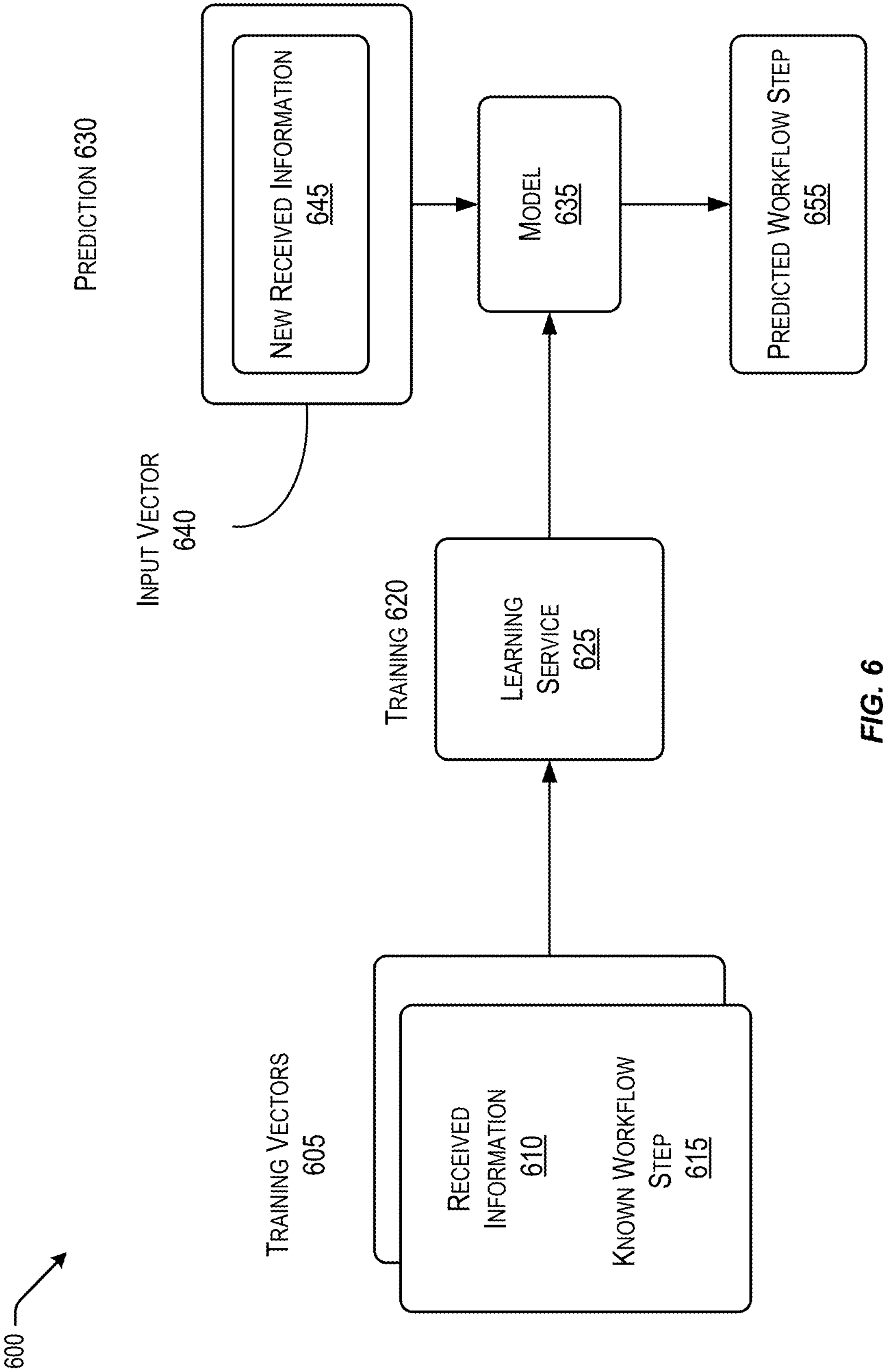
FIG. 6 depicts an architecture for training a machine learning model in accordance with at least one embodiment.

FIG. 6 depicts an architecture for training a machine learning model according to the embodiments of the present disclosure. The machine learning model can be trained to identify a next step for a development workflow (e.g., at 512). Training vectors 605 are shown with received information 610 and a known workflow step 615. Received information 610 can include any information that is received via a user interface as described herein. For ease of illustration, only two training vectors are shown, but the number of training vectors may be much larger, e.g., 10, 20, 100, 1,000, 10,000, 100,000, or more.

Received information 610 have property fields that can correspond to the event data received at the workflow system (e.g., Workflow System 202) and the skilled person will appreciate the various ways that such data can be configured. Known workflow step 615 include the next step of a development workflow. For example, the machine learning model can be trained to identify a step in a workflow based on the received information from a preceding workflow step. The trained machine learning model may be able to implement a dynamic development workflow where the specific ordered steps in the workflow are not predetermined. The known workflow steps 615 can be determined by monitoring the behavior of developers as they navigate the workflow system. For example, the workflow system may allow a developer to create a custom workflow, or to modify an existing workflow, by selecting a step from a library of workflow steps. In such circumstances, the preceding step, the received information from the preceding step (e.g., received information 610), and the next step (e.g., known workflow step 615) in the workflow can be used to train the machine learning model to predict steps for dynamic workflows. Received information 610 can include information identifying the preceding step in some embodiments.

Training vectors 605 can be used by a learning service 625 to perform training 620. A service, such as learning service 625, being one or more computing devices configured to execute computer code to perform one or more operations that make up the service. Learning service 625 can optimize parameters of a model 635 such that a quality metric (e.g., accuracy of model 635) is achieved with one or more specified criteria. The accuracy may be measured by comparing known workflow step 615 to predicted workflow step 655. Parameters of model 635 can be iteratively varied to increase accuracy. Determining a quality metric can be implemented for any arbitrary function including the set of all risk, loss, utility, and decision functions.

In some embodiments of training, a gradient may be determined for how varying the parameters affects a cost function, which can provide a measure of how accurate the current state of the machine learning model is. The gradient can be used in conjunction with a learning step (e.g., a measure of how much the parameters of the model should be updated for a given time step of the optimization process). The parameters (which can include weights, matrix transformations, and probability distributions) can thus be optimized to provide an optimal value of the cost function, which can be measured as being above or below a threshold (i.e., exceeds a threshold) or that the cost function does not change significantly for several time steps, as examples. In other embodiments, training can be implemented with methods that do not require a hessian or gradient calculation, such as dynamic programming or evolutionary algorithms.

A prediction stage 630 can provide a predicted workflow step 655 for a new signature vector 640 based on new received information 645. The predicted workflow step 655 can be a predicted next step in a dynamic workflow that corresponds to the input vector 640. The new received information 645 can be of a similar type as received information 610. If new received information 645 values are of a different type, a transformation can be performed on the data to obtain data in a similar format as received information 610. Ideally, predicted workflow step 655 corresponds to the true workflow step for input vector 640.

A "machine learning model" (ML model) can refer to a software engine configured to be run on one or more processors to provide a classification or numerical value of a property of one or more samples. An ML model can be generated using sample data (e.g., training data) to make predictions on test data. One example is an unsupervised learning model. Another example type of model is supervised learning that can be used with embodiments of the present disclosure. Example supervised learning models may include different approaches and algorithms including analytical learning, statistical models, artificial neural network, backpropagation, boosting (meta-algorithm), Bayesian statistics, case-based reasoning, decision tree learning, inductive logic programming, Gaussian process regression, genetic programming, group method of data handling, kernel estimators, learning automata, learning classifier systems, minimum message length (decision trees, decision graphs, etc.), multilinear subspace learning, naive Bayes classifier, maximum entropy classifier, conditional random field, nearest neighbor algorithm, probably approximately correct learning (PAC) learning, ripple down rules, a knowledge acquisition methodology, symbolic machine learning algorithms, subsymbolic machine learning algorithms, minimum complexity machines (MCM), random forests, ensembles of classifiers, ordinal classification, data preprocessing, handling imbalanced datasets, statistical relational learning, or Proaftn, a multicriteria classification algorithm. The model may include linear regression, logistic regression, deep recurrent neural network (e.g., long short term memory, LSTM), hidden Markov model (HMM), linear discriminant analysis (LDA), k-means clustering, density-based spatial clustering of applications with noise (DBSCAN), random forest algorithm, support vector machine (SVM), or any model described herein. Supervised learning models can be trained in various ways using various cost/loss functions that define the error from the known label (e.g., least squares and absolute difference from known classification) and various optimization techniques, e.g., using backpropagation, steepest descent, conjugate gradient, and Newton and quasi-Newton techniques.

Examples of machine learning models include deep learning models, neural networks (e.g., deep learning neural networks), kernel-based regressions, adaptive basis regression or classification, Bayesian methods, ensemble methods, logistic regression and extensions, Gaussian processes, support vector machines (SVMs), a probabilistic model, and a probabilistic graphical model. Embodiments using neural networks can employ using wide and tensorized deep architectures, convolutional layers, dropout, various neural activations, and regularization steps.

Figure 7:
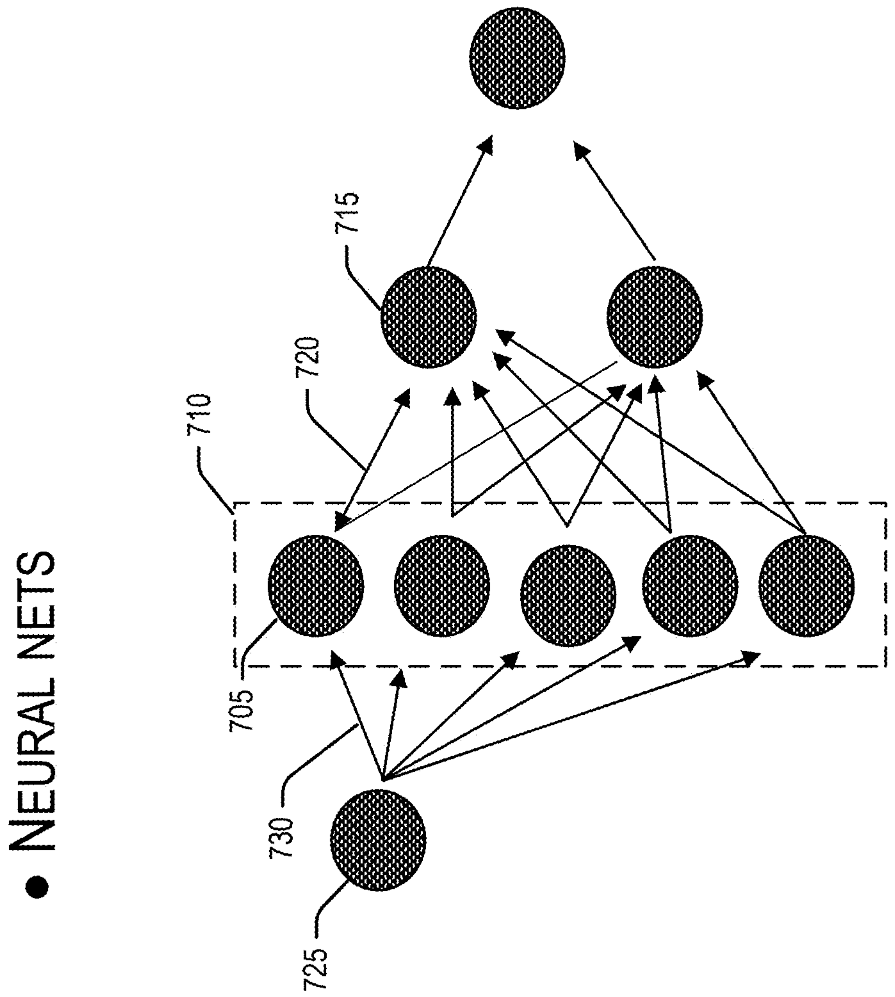
FIG. 7 shows an example machine learning model of a neural network in accordance with at least one embodiment.

FIG. 7 shows an example machine learning model of a neural network, according to at least one embodiment. As an example, model 735 can be a neural network that includes a number of neurons (e.g., Adaptive basis functions) organized in layers. Model 735 can be an example of a machine learning model that can be trained using architecture 600. For example, neuron 705 can be part of layer 710. The neurons can be connected by edges between neurons. For example, neuron 705 can be connected to neuron 715 by edge 720. A neuron can be connected to any number of different neurons in any number of layers. For instance, neuron 705 can be connected to neuron 725 by edge 730 in addition to being connected to neuron 715.

The training of the neural network can iteratively search for the best configuration of the parameter of the neural network for feature recognition and prediction performance. Various numbers of layers and nodes may be used. A person with skills in the art can easily recognize variations in a neural network design and design of other machine learning models. For example, neural networks can include graph neural networks that are configured to operate on unstructured data. A graph neural network can receive a graph (e.g., nodes connected by edges) as an input to the model and the graph neural network can learn the features of this input through pairwise message passing. In pairwise message passing, nodes exchange information and each node iteratively updates its representation based on the passed information.

Figure 8:
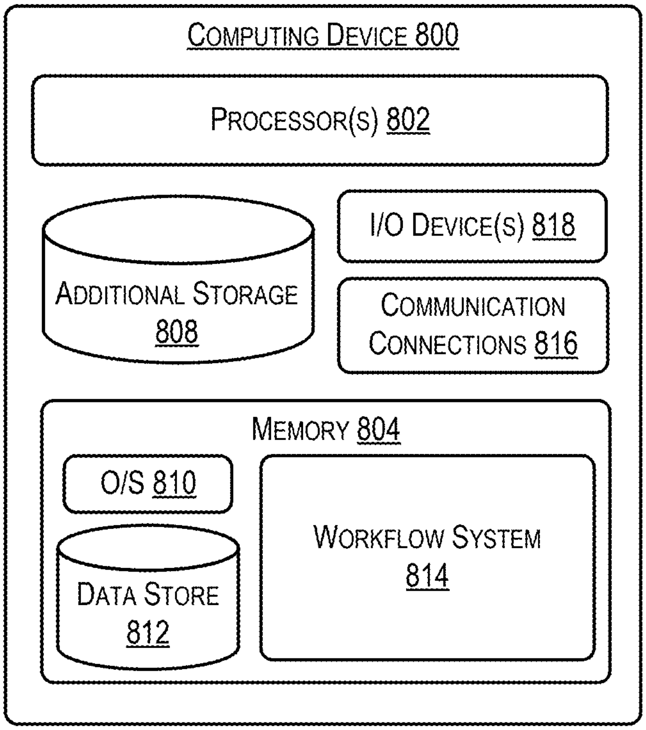
FIG. 8 illustrates an example computing device in accordance with at least one embodiment.

FIG. 8 illustrates an example computing device 800 that may implement the methods disclosed herein. In some embodiments, the computing device 800 may include one or more processors (e.g., processor(s) 802). The processor(s) 802 may be implemented in hardware, computer-executable instructions, firmware, or combinations thereof. Computer-executable instruction or firmware implementations of the processor(s) 802 may include computer-executable or machine-executable instructions written in any suitable programming language.

Computing device 800 may include memory 804. The memory 804 may store computer-executable instructions that are loadable and executable by the processor(s) 802, as well as data generated during the execution of these programs. The memory 804 may be volatile (such as RAM) and/or non-volatile (such as ROM, flash memory, etc.). The computing device 800 may include additional storage 806, which may include removable storage and/or non-removable storage. The additional storage 806 may include, but is not limited to, magnetic storage, optical disks and/or tape storage. The disk drives and their associated computer-readable media may provide non-volatile storage of computer-readable instructions, data structures, program engines, and other data for the computing devices. In some implementations, the memory 804 or additional storage 806 may individually, or collectively, include multiple different types of memory, such as SRAM, DRAM, or ROM.

The memory 804 and/or additional storage 808 may be examples of computer-readable storage media. Computer-readable storage media may include volatile, or non-volatile, removable or non-removable media implemented in any method or technology for storage of information such as computer-readable instructions, data structures, program engines, or other data. In some embodiments, memory 804 and the additional storage 804 are examples of computer storage media. Memory 804 and/or additional storage 808 may include, but are not limited to, PRAM, SRAM, DRAM, RAM, ROM, EEPROM, flash memory or other memory technology, CD-ROM, DVD, magnetic tape, magnetic disk storage or other magnetic storage devices, or any other medium which can be used to store the desired information and which can be accessed by the computing device 800. Combinations of any of the above should also be included within the scope of computer-readable media. Computer-readable media may include computer-readable instructions, program engines, or other data transmitted within a data signal, such as a carrier wave, or other transmission. However, as used herein, computer-readable storage media does not include computer-readable communication media.

The memory 804 may include an operating system 808 and one or more data stores 810, and/or one or more application programs, engines, or services for implementing the features disclosed herein, such as the features provided by the Workflow System 814 (an example of the Workflow System 202 of FIG. 2).

The computing device may also contain communications connection(s) 816 that allow the computing device 800 to communicate with a stored database, another computing device, a server, user terminals and/or other devices (e.g., via one or more networks, not depicted). The computing device may also include I/O device(s) 818, such as a keyboard, a mouse, a pen, a voice input device, a touch input device, a display, speakers, a printer, etc.

In various embodiments, a developer can initiate a development workflow. For example, the developer can provide a request to a workflow system. The developer may provide authentication information as part of the request (e.g., Diffie-Helman key exchange). This development workflow can represent an ordered series of steps for performing a standardized computer function of a workflow system. The workflow system can request a development workflow from a repository. The development workflow can be stored as a text file that is provided to a client device that the developer is using to interact with the workflow system. The development workflow can be presented as multiple files in some embodiments (e.g., a separate file for each step). The file can be presented with instructions (e.g., code) that causes the client device to present a user interface. A first portion of the user interface may present technical documentation and a second portion of the user interface may present an interactive field for performing an action. The action may include generating a file and providing the file to a service that is external to the workflow service. For some or all of the steps in the workflow, the workflow system can receive information via the second portion of the user interface, and the workflow system can take an action in accordance with the received information. After receiving the information for a step, the workflow system can determine a next step in the workflow or whether the workflow has concluded. The workflow may be paused, and the progress saved by the workflow system, in some embodiments.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, engines, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program engines, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:

receiving, from an application of a client device, a request for a first step of a development workflow for deploying a standardized computer function within an organization, wherein the request identifies the development workflow and includes an account identifier;

identifying a first file corresponding to the first step of the development workflow in a repository, wherein the first file comprises code corresponding to a first text element and a first interactive element;

providing the first file to the application of the client device, wherein the first file is configured to cause the application of the client device to display the first text element at a first portion of a graphical interface and the first interactive element at a second portion of the graphical interface, wherein the first text element is descriptive of the first interactive element;

receiving first information corresponding to the first step of the development workflow from the first interactive element displayed by the graphical interface of the application, wherein the received first information is identified by the first text element, and wherein the received first information comprises configuration settings for one or more servers of the organization;

generating a second file based at least in part on the received first information, the second file usable to implement a second step of the development workflow; and generating a deployment file for implementing the first step of the development workflow based at least in part on the received first information.

2. The method of claim 1, further comprising:

providing the deployment file to the one or more servers at a conclusion of the development workflow, wherein the deployment file comprises instructions to cause the one or more servers to implement an application programming interface (API).

3. The method of claim 1, wherein the second file comprises code that is configured to cause the application of the client device to display a second text element at a third portion of the graphical interface and a second interactive element at a fourth portion of the graphical interface and wherein the method further comprises:

associating the second file and the account identifier; and storing the second file to the repository.

4. The method of claim 3, further comprising:

receiving a request for the second step of the development workflow from the application of the client device, wherein the request includes the account identifier;

identifying the second file corresponding to the second step of the development workflow in the repository;

providing the second file to the application of the client device;

receiving second information corresponding to the second step of the development workflow from the second interactive element displayed by the graphical interface of the application, wherein the received second information is identified by the second text element;

performing an action in accordance with the second step of the development workflow, wherein the action is performed based at least in part on the received second information;

generating a third file based at least in part on the received second information, the third file usable to implement a third step of the development workflow;

associating the third file and the account identifier; and storing the third file to the repository.

5. The method of claim 1, wherein the deployment file specifies one or more settings for causing the one or more servers to deploy an application programming interface (API) that permits the client device to access records data of the organization, and wherein the application programming interface (API) is an application programming interface (API) proxy for facilitating communication with a target application programming interface (API).

6. The method of claim 5, wherein the received first information identifies the target application programming interface (API).

7. A computing device, comprising:

one or more non-transitory memories; and one or more processors in communication with the one or more non-transitory memories and configured to execute instructions stored in the one or more memories to:

receive, from an application of a client device, a request for a first step of a development workflow for deploying a standardized computer function within an organization, wherein the request identifies the development workflow and includes an account identifier;

identify a first file corresponding to the first step of the development workflow in a repository, wherein the first file comprises code corresponding to a first text element and a first interactive element;

provide the first file to the application of the client device, wherein the first file is configured to cause the application of the client device to display the first text element at a first portion of a graphical interface and the first interactive element at a second portion of the graphical interface, wherein the first text element is descriptive of the first interactive element;

receive first information corresponding to the first step of the development workflow from the first interactive element displayed by the graphical interface of the application, wherein the received first information is identified by the first text element, and wherein the received first information comprises configuration settings for one or more servers of the organization;

generate a second file based at least in part on the received first information, the second file usable to implement a second step of the development workflow; and generate a deployment file for implementing the first step of the development workflow based on the received first information.

8. The computing device of claim 7, wherein the instructions stored in the one or more memories to cause the one or more processors to:

provide the deployment file to the one or more servers at a conclusion of the development workflow, wherein the deployment file comprises instructions to cause the one or more servers to implement an application programming interface (API).

9. The computing device of claim 7, wherein the second file comprises code that is configured to cause the application of the client device to display a second text element at a third portion of the graphical interface and a second interactive element at a fourth portion of the graphical interface and wherein the instructions stored in the one or more memories further cause the one or more processors to:

associate the second file and the account identifier; and store the second file to the repository.

10. The computing device of claim 9, wherein the instructions stored in the one or more memories to cause the one or more processors to:

receive a request for the second step of the development workflow from the application of the client device, wherein the request includes the account identifier;

identify the second file corresponding to the second step of the development workflow in the repository;

provide the second file to the application of the client device;

receive second information corresponding to the second step of the development workflow from the second interactive element displayed by the graphical interface of the application, wherein the received second information is identified by the second text element;

perform an action in accordance with the second step of the development workflow, wherein the action is performed based at least in part on the received second information;

generate a third file based at least in part on the received second information, the third file usable to implement a third step of the development workflow;

associate the third file and the account identifier; and store the third file to the repository.

11. The computing device of claim 7, wherein the deployment file specifies one or more settings for causing the one or more servers to deploy an application programming interface (API) that permits the client device to access records data of the organization, and wherein the application programming interface (API) is an application programming interface (API) proxy for facilitating communication with a target application programming interface (API).

12. The computing device of claim 11, wherein the received first information identifies the target application programming interface (API).

13. A non-transitory computer-readable medium storing a plurality of instructions that, when executed by one or more processors of a computing device, cause the one or more processors to:

receive, from an application of a client device, a request for a first step of a development workflow for deploying a standardized computer function within an organization, wherein the request identifies the development workflow and includes an account identifier;

identify a first file corresponding to the first step of the development workflow in a repository, wherein the first file comprises code corresponding to a first text element and a first interactive element;

provide the first file to the application of the client device, wherein the first file is configured to cause the application of the client device to display the first text element at a first portion of a graphical interface and the first interactive element at a second portion of the graphical interface, wherein the first text element is descriptive of the first interactive element;

receive first information corresponding to the first step of the development workflow from the first interactive element displayed by the graphical interface of the application, wherein the received first information is identified by the first text element, and wherein the received first information comprises configuration settings for one or more servers of the organization;

generate a second file based at least in part on the received first information, the second file usable to implement a second step of the development workflow; and generate a deployment file for implementing the first step of the development workflow based at least in part on the received first information.

14. The non-transitory computer-readable medium of claim 13, wherein the plurality of instructions cause the one or more processors to:

provide the deployment file to the one or more servers at a conclusion of the development workflow, wherein the deployment file comprises instructions to cause the one or more servers to implement an application programming interface (API).

15. The non-transitory computer-readable medium of claim 13, wherein the second file comprises code that is configured to cause the application of the client device to display a second text element at a third portion of the graphical interface and a second interactive element at a fourth portion of the graphical interface and wherein the plurality of instructions further cause the one or more processors to:

associate the second file and the account identifier; and store the second file to the repository.

16. The non-transitory computer-readable medium of claim 15, wherein the plurality of instructions cause the one or more processors to:

receive a request for the second step of the development workflow from the application of the client device, wherein the request includes the account identifier;

identify the second file corresponding to the second step of the development workflow in the repository;

provide the second file to the application of the client device;

receive second information corresponding to the second step of the development workflow from the second interactive element displayed by the graphical interface of the application, wherein the received second information is identified by the second text element;

perform an action in accordance with the second step of the development workflow, wherein the action is performed based at least in part on the received second information;

generate a third file based at least in part on the received second information, the third file usable to implement a third step of the development workflow;

associate the third file and the account identifier; and store the third file to the repository.

17. The non-transitory computer-readable medium of claim 13, wherein the deployment file specifies one or more settings for causing the one or more servers to deploy an application programming interface (API) that permits the client device to access records data of the organization, and wherein the application programming interface (API) is an application programming interface (API) proxy for facilitating communication with a target application programming interface (API).

18. The non-transitory computer-readable medium of claim 17, wherein the received first information identifies the target application programming interface (API).

* * * * *